(12) United States Patent
Sukumar et al.

(10) Patent No.: US 8,370,889 B2
(45) Date of Patent: Feb. 5, 2013

(54) SWITCHED DIGITAL VIDEO CLIENT REVERSE CHANNEL TRAFFIC REDUCTION

(76) Inventors: Kanthimathi Gayatri Sukumar, Coimbatore (IN); Balaprakash Sivaprakasam, Chennai (IN); L. Gnanendra Satish, Chennai (IN); Jason C. Osborne, Lilburn, GA (US)

(*) Notice: Subject to any disclaimer, the term of this patent is extended or adjusted under 35 U.S.C. 154(b) by 125 days.

(21) Appl. No.: 11/692,457

(22) Filed: Mar. 28, 2007

(65) Prior Publication Data

US 2008/0244679 A1 Oct. 2, 2008

(51) Int. Cl.
- *H04N 7/173* (2011.01)
- *H04N 7/16* (2011.01)
- *G06F 3/00* (2006.01)

(52) U.S. Cl. .......... 725/120; 725/139; 725/117; 725/38; 725/91; 725/93; 725/100; 725/103; 725/105; 725/111; 725/114; 725/116; 725/121; 725/131; 725/135; 725/140; 725/143; 725/144; 725/151; 348/E7.071; 348/E7.072

(58) Field of Classification Search .............. 725/38–42, 725/73, 80, 93, 100, 103, 105, 109, 111, 725/114, 116, 121, 131, 135, 139, 140, 143, 725/151

See application file for complete search history.

(56) References Cited

U.S. PATENT DOCUMENTS

| | | | | |
|---|---|---|---|---|
| 5,572,347 A | 11/1996 | Burton et al. | ................. | 359/124 |
| 5,594,509 A | 1/1997 | Florin et al. | ................. | 348/731 |
| 5,600,663 A | 2/1997 | Ayanouglu et al. | ............. | 371/41 |
| 5,633,683 A | 5/1997 | Rosengren et al. | ........... | 348/385 |
| 5,687,167 A | 11/1997 | Bertin et al. | .................. | 370/254 |
| 5,699,365 A | 12/1997 | Klayman et al. | ................ | 371/55 |
| 5,699,369 A | 12/1997 | Guha | ............................... | 371/41 |
| 5,790,546 A | 8/1998 | Dobbins et al. | | |
| 5,793,436 A | 8/1998 | Kim | .............................. | 348/497 |
| 5,808,662 A | 9/1998 | Kinney et al. | .................. | 348/15 |
| 5,815,145 A | 9/1998 | Matthews | ..................... | 345/327 |
| 5,870,087 A | 2/1999 | Chau | ............................. | 715/202 |

(Continued)

FOREIGN PATENT DOCUMENTS

| | | |
|---|---|---|
| EP | 0 714 192 | 5/1996 |
| WO | WO 99/09741 | 2/1999 |

(Continued)

OTHER PUBLICATIONS

U.S. Appl. No. 11/164,102, filed Nov. 10, 2005, entitled "Quality of Service Management in a Switched Digital Video Environment," Inventor(s): William C. VerSteeg, et al.

(Continued)

*Primary Examiner* — Nasser Goodarzi
*Assistant Examiner* — Mary A Kay
(74) *Attorney, Agent, or Firm* — Merchant & Gould

(57) ABSTRACT

Systems and methods are disclosed for enabling a switched digital video (SDV) client to intelligently generate and transmit reverse request in a SDV system. In this manner, reverse channel traffic is reduced. During rapid channel changes using the up and down keys on a remote control, the SDV client waits a predetermined amount of time before generating a reverse request that is subsequently transmitted upstream to a headend server. By way of example, changing broadcasted channels quickly will not generate a reverse request until the predetermined amount of time is over. In the event that a changed channel is an SDV session, a program select request is immediately generated in order to begin receiving the SDV session.

12 Claims, 5 Drawing Sheets

U.S. PATENT DOCUMENTS

| | | | | |
|---|---|---|---|---|
| 5,913,031 | A | 6/1999 | Blanchard | 395/200.34 |
| 5,949,795 | A | 9/1999 | Moroney et al. | 370/516 |
| 6,016,166 | A | 1/2000 | Huang et al. | 348/515 |
| 6,101,221 | A | 8/2000 | Varanasi et al. | 375/240 |
| 6,118,498 | A | 9/2000 | Reitmeier | 348/725 |
| 6,119,092 | A | 9/2000 | Patwardhan et al. | 704/503 |
| 6,173,115 | B1 | 1/2001 | Willis | 386/125 |
| 6,252,849 | B1 | 6/2001 | Rom et al. | 370/230 |
| 6,278,716 | B1 | 8/2001 | Rubenstein et al. | 370/432 |
| 6,307,839 | B1 | 10/2001 | Gerszberg et al. | 370/235 |
| 6,310,918 | B1 | 10/2001 | Saha et al. | 375/240.16 |
| 6,453,471 | B1 | 9/2002 | Klosterman | 725/41 |
| 6,480,541 | B1 | 11/2002 | Girod et al. | 375/240.12 |
| 6,510,553 | B1 | 1/2003 | Hazra | 725/87 |
| 6,538,992 | B1 | 3/2003 | Subbiah et al. | 370/230 |
| 6,594,798 | B1 | 7/2003 | Chou et al. | 370/389 |
| 6,628,301 | B1 | 9/2003 | Acton et al. | 345/716 |
| 6,665,751 | B1 | 12/2003 | Chen et al. | 710/52 |
| 6,678,332 | B1 | 1/2004 | Gardere et al. | 375/240.26 |
| 6,701,528 | B1 | 3/2004 | Arsenault et al. | 725/89 |
| 6,728,965 | B1* | 4/2004 | Mao | 725/38 |
| 6,763,019 | B2 | 7/2004 | Mehta et al. | 725/88 |
| 6,792,047 | B1 | 9/2004 | Bixby et al. | 375/240.26 |
| 6,871,006 | B1 | 3/2005 | Oguz et al. | 386/68 |
| 6,973,667 | B2 | 12/2005 | Fritsch | 725/88 |
| 7,017,102 | B1 | 3/2006 | Kristensson et al. | 714/786 |
| 7,054,643 | B2 | 5/2006 | Trossen et al. | 455/454 |
| 7,065,779 | B1 | 6/2006 | Crocker et al. | 725/111 |
| 7,073,117 | B1 | 7/2006 | Ireland et al. | 714/786 |
| 7,096,481 | B1 | 8/2006 | Forecast et al. | 725/32 |
| 7,113,484 | B1 | 9/2006 | Chapman et al. | 370/252 |
| 7,114,172 | B2 | 9/2006 | Lord | 725/80 |
| 7,228,356 | B2 | 6/2007 | Nguyen et al. | 709/231 |
| 7,266,127 | B2 | 9/2007 | Gupta et al. | 370/413 |
| 7,281,058 | B1 | 10/2007 | Shepherd et al. | 709/238 |
| 7,412,149 | B2 | 8/2008 | Cohen et al. | 386/68 |
| 7,433,946 | B2 | 10/2008 | Shen et al. | |
| 7,447,978 | B2 | 11/2008 | Hannuksela | 714/776 |
| 7,477,653 | B2 | 1/2009 | Smith et al. | 370/432 |
| 7,490,344 | B2 | 2/2009 | Haberman et al. | 370/432 |
| 7,584,404 | B2 | 9/2009 | Kozintsev et al. | 714/776 |
| 7,610,606 | B2 | 10/2009 | Carlucci et al. | 725/95 |
| 7,620,294 | B2 | 11/2009 | Green et al. | 725/98 |
| 7,627,886 | B2 | 12/2009 | Barbanson et al. | 725/90 |
| 7,685,616 | B2 | 3/2010 | Virdi et al. | 725/38 |
| 7,725,797 | B2 | 5/2010 | Ver Steeg | 714/751 |
| 7,729,590 | B2 | 6/2010 | Kosugi | 386/68 |
| 7,742,407 | B2 | 6/2010 | Versteeg et al. | 370/230 |
| 7,761,902 | B2 | 7/2010 | Liu et al. | 725/92 |
| 7,774,672 | B2 | 8/2010 | Ver Steeg et al. | 714/751 |
| 7,849,490 | B2* | 12/2010 | Akhter | 725/120 |
| 7,870,465 | B2 | 1/2011 | VerSteeg | 714/774 |
| 7,873,760 | B2 | 1/2011 | Versteeg | 710/52 |
| 7,877,660 | B2 | 1/2011 | Versteeg | 714/751 |
| 7,899,046 | B2 | 3/2011 | Ver Steeg | 370/389 |
| 8,099,756 | B2 | 1/2012 | Versteeg | 725/95 |
| 2001/0025378 | A1 | 9/2001 | Sakamoto et al. | |
| 2002/0019853 | A1 | 2/2002 | Vange et al. | |
| 2002/0056107 | A1 | 5/2002 | Schlack et al. | 725/35 |
| 2002/0057367 | A1* | 5/2002 | Baldock | 348/554 |
| 2002/0067909 | A1 | 6/2002 | Iivonen | 386/88 |
| 2002/0112244 | A1 | 8/2002 | Liou et al. | 725/93 |
| 2002/0129129 | A1 | 9/2002 | Bloch et al. | 717/175 |
| 2002/0181454 | A1 | 12/2002 | Norman et al. | |
| 2002/0184637 | A1 | 12/2002 | Perlman | 725/87 |
| 2002/0199203 | A1 | 12/2002 | Duffy et al. | |
| 2003/0002849 | A1 | 1/2003 | Lord | 386/46 |
| 2003/0007212 | A1 | 1/2003 | Sala et al. | 398/72 |
| 2003/0007507 | A1 | 1/2003 | Rajwan et al. | 370/468 |
| 2003/0007508 | A1 | 1/2003 | Sala et al. | 370/468 |
| 2003/0007724 | A1 | 1/2003 | Gummalla et al. | 385/24 |
| 2003/0014752 | A1 | 1/2003 | Zaslavsky et al. | 725/40 |
| 2003/0048808 | A1 | 3/2003 | Stahl et al. | 370/487 |
| 2003/0133458 | A1 | 7/2003 | Sato et al. | 370/395 |
| 2003/0149975 | A1 | 8/2003 | Eldering et al. | 725/34 |
| 2003/0156218 | A1 | 8/2003 | Laksono | 709/231 |
| 2003/0159143 | A1 | 8/2003 | Chan | 725/41 |
| 2003/0188253 | A1 | 10/2003 | Kauschke et al. | 714/755 |
| 2003/0188311 | A1* | 10/2003 | Yuen et al. | 725/42 |
| 2003/0196211 | A1 | 10/2003 | Chan | 725/131 |
| 2003/0200551 | A1 | 10/2003 | Kang | 725/120 |
| 2003/0217365 | A1 | 11/2003 | Caputo | 725/95 |
| 2004/0111470 | A1 | 6/2004 | Poulsen et al. | 709/204 |
| 2004/0133907 | A1 | 7/2004 | Rodriguez | |
| 2004/0184776 | A1* | 9/2004 | Inoue et al. | 386/83 |
| 2004/0194147 | A1* | 9/2004 | Craven et al. | 725/111 |
| 2004/0204945 | A1 | 10/2004 | Okuda et al. | 704/500 |
| 2004/0225877 | A1 | 11/2004 | Huang | 713/100 |
| 2004/0226044 | A1 | 11/2004 | Goode | 725/95 |
| 2004/0228277 | A1 | 11/2004 | Pierce | |
| 2004/0260814 | A1 | 12/2004 | Budge et al. | 709/227 |
| 2005/0155075 | A1 | 7/2005 | Crichton | 725/105 |
| 2005/0166242 | A1 | 7/2005 | Matsumoto et al. | 725/88 |
| 2005/0172326 | A1 | 8/2005 | Jerding et al. | 725/116 |
| 2005/0190781 | A1 | 9/2005 | Green et al. | 370/432 |
| 2005/0204251 | A1 | 9/2005 | Moon et al. | 714/748 |
| 2005/0228892 | A1 | 10/2005 | Riley et al. | 709/228 |
| 2005/0289618 | A1 | 12/2005 | Hardin | 725/95 |
| 2005/0289623 | A1 | 12/2005 | Midani et al. | 725/100 |
| 2006/0013247 | A1 | 1/2006 | Kotch et al. | 370/437 |
| 2006/0025149 | A1 | 2/2006 | Karaoguz et al. | 455/452.2 |
| 2006/0074968 | A1 | 4/2006 | Gyetko | 707/102 |
| 2006/0080707 | A1 | 4/2006 | Laksono | 725/38 |
| 2006/0112325 | A1 | 5/2006 | Ducheneaut et al. | 715/500.1 |
| 2006/0212917 | A1 | 9/2006 | Boucher et al. | 725/105 |
| 2006/0236358 | A1 | 10/2006 | Liu et al. | 725/117 |
| 2006/0242240 | A1 | 10/2006 | Parker et al. | 709/205 |
| 2007/0002789 | A1 | 1/2007 | Zhang | 370/328 |
| 2007/0044130 | A1 | 2/2007 | Skoog | 725/110 |
| 2007/0098015 | A1 | 5/2007 | Eijsberg | 370/468 |
| 2007/0104226 | A1 | 5/2007 | Ver Steeg et al. | 370/485 |
| 2007/0106782 | A1 | 5/2007 | Ver Steeg et al. | 709/224 |
| 2007/0107023 | A1 | 5/2007 | Ver Steeg et al. | 725/95 |
| 2007/0107024 | A1 | 5/2007 | Ver Steeg et al. | 725/95 |
| 2007/0130393 | A1 | 6/2007 | Ver Steeg | 710/57 |
| 2007/0169158 | A1 | 7/2007 | Folgner et al. | 725/90 |
| 2007/0173993 | A1* | 7/2007 | Nielsen et al. | 701/35 |
| 2007/0186228 | A1 | 8/2007 | Ramaswamy et al. | 725/14 |
| 2007/0192812 | A1 | 8/2007 | Pickens et al. | 725/94 |
| 2007/0220577 | A1* | 9/2007 | Kongalath | 725/131 |
| 2007/0261087 | A1 | 11/2007 | Denney et al. | 725/95 |
| 2008/0008167 | A1 | 1/2008 | Ver Steeg | 370/389 |
| 2008/0022190 | A1 | 1/2008 | Ver Steeg | 714/776 |
| 2008/0022320 | A1 | 1/2008 | Ver Steeg | 725/78 |
| 2008/0028279 | A1 | 1/2008 | Ver Steeg | 714/776 |
| 2008/0028280 | A1 | 1/2008 | Ver Steeg | 714/776 |
| 2008/0040767 | A1 | 2/2008 | McCarthy et al. | 725/132 |
| 2008/0109692 | A1 | 5/2008 | Ver Steeg | 714/746 |
| 2008/0134005 | A1 | 6/2008 | Izzat et al. | 714/774 |
| 2008/0192820 | A1 | 8/2008 | Brooks et al. | 375/240.02 |
| 2008/0229379 | A1* | 9/2008 | Akhter | 725/139 |
| 2008/0244667 | A1 | 10/2008 | Osborne | 725/94 |
| 2009/0007199 | A1 | 1/2009 | La Joie | 725/95 |
| 2009/0031342 | A1 | 1/2009 | Ver Steeg et al. | 725/38 |
| 2009/0031392 | A1 | 1/2009 | Ver Steeg et al. | 725/151 |
| 2009/0222875 | A1 | 9/2009 | Cheng et al. | 725/147 |
| 2010/0046634 | A1 | 2/2010 | Dai et al. | 375/240.25 |

FOREIGN PATENT DOCUMENTS

| | | |
|---|---|---|
| WO | WO 01/69831 | 9/2001 |
| WO | WO 2005/020556 | 3/2005 |
| WO | WO 2006/019505 | 2/2006 |
| WO | WO 2006/061765 | 6/2006 |
| WO | WO 2007/111693 | 10/2007 |
| WO | WO 2007/111695 | 10/2007 |
| WO | WO 2007/111697 | 10/2007 |
| WO | WO 2007/120260 | 10/2007 |
| WO | WO 2007/120261 | 10/2007 |
| WO | WO 2008/006011 | 1/2008 |
| WO | WO 2008/006012 | 1/2008 |
| WO | WO 2008/006013 | 1/2008 |
| WO | WO 2008/006014 | 1/2008 |
| WO | WO 2008/048828 | 4/2008 |
| WO | WO 2008/118678 | 10/2008 |
| WO | WO 2008/121545 | 10/2008 |
| WO | WO 2009/018042 | 2/2009 |
| WO | WO 2009/018043 | 2/2009 |

OTHER PUBLICATIONS

U.S. Appl. No. 11/164,110, filed Nov. 10, 2005, entitled "Channel Changes Between Services With Differing Bandwidth in a Switched Digital Video System," Inventor(s): William C. VerSteeg, et al.
U.S. Appl. No. 11/164,115, filed Nov. 10, 2005, entitled "Atomic Channel Changes in a Switched Digital Video System," Inventor(s): William C. VerSteeg, et al.
U.S. Appl. No. 11/164,119, filed Nov. 10, 2005, entitled "Bandwidth Management in Each Network Device in a Switched Digital Video Environment," Inventor(s): William C. VerSteeg, et al.
U.S. Appl. No. 11/691,565, filed Mar. 27, 2007, entitled "Bandwidth Sensitive Switched Digital Video Content Delivery," Inventor: Jason C. Osborne.
European Patent Application, EP 1 294 193, Sep. 9, 2002.
European Patent Application, EP 1335 521, Oct. 24, 2002.
European Patent Application, EP 1589 706, Apr. 19, 2004.
European Patent Application, EP 1 684 450, Oct. 26, 2004.
U.S. Official Action dated Mar. 5, 2007 in U.S. Appl. No. 10/080,380.
U.S. Official Action dated Sep. 19, 2007 in U.S. Appl. No. 10/080,380.
U.S. Official Action dated Dec. 14, 2007 in U.S. Appl. No. 10/119,700.
U.S. Official Action dated Feb. 22, 2008 in U.S. Appl. No. 11/164,147.
U.S. Official Action dated Apr. 8, 2008 in U.S. Appl. No. 10/080,380.
U.S. Official Action dated Jul. 1, 2008 in U.S. Appl. No. 10/119,700.
U.S. Official Action dated Jul. 11, 2008 in U.S. Appl. No. 11/164,110.
U.S. Official Action dated Aug. 21, 2008 in U.S. Appl. No. 11/428,336.
U.S. Official Action dated Sep. 3, 2008 in U.S. Appl. No. 11/164,115.
U.S. Official Action dated Sep. 19, 2008 in U.S. Appl. No. 11/164,102.
U.S. Official Action dated Sep. 26, 2008 in U.S. Appl. No. 11/164,147.
U.S. Official Action dated Nov. 17, 2008 in U.S. Appl. No. 10/119,700.
U.S. Official Action dated Dec. 1, 2008 in U.S. Appl. No. 10/080,380.
U.S. Official Action dated Jan. 8, 2009 in U.S. Appl. No. 11/164,110.
U.S. Official Action dated Jan. 9, 2009 in U.S. Appl. No. 11/164,119.
U.S. Official Action dated Feb. 2, 2009 in U.S. Appl. No. 11/482,439.
U.S. Official Action dated Feb. 12, 2009 in U.S. Appl. No. 11/428,336.
U.S. Official Action dated Feb. 19, 2009 in U.S. Appl. No. 11/164,115.
U.S. Official Action dated Mar. 18, 2009 in U.S. Appl. No. 11/164,147.
U.S. Official Action dated Mar. 24, 2009 in U.S. Appl. No. 11/164,102.
U.S. Official Action dated Apr. 30, 2009 in U.S. Appl. No. 10/119,700.
U.S. Official Action dated Jun. 23, 2009 in U.S. Appl. No. 11/428,336.
U.S. Official Action dated Jun. 23, 2009 in U.S. Appl. No. 11/691,565.
U.S. Official Action dated Jul. 17, 2009 in U.S. Appl. No. 11/164,119.
U.S. Official Action dated Jul. 27, 2009 in U.S. Appl. No. 11/164,147.
U.S. Official Action dated Jul. 31, 2009 in U.S. Appl. No. 11/482,439.
U.S. Official Action dated Aug. 5, 2009 in U.S. Appl. No. 11/164,110.
U.S. Official Action dated Aug. 5, 2009 in U.S. Appl. No. 11/164,115.
U.S. Official Action dated Aug. 18, 2009 in U.S. Appl. No. 11/164,102.
U.S. Official Action dated Sep. 11, 2009 in U.S. Appl. No. 11/482,437.
U.S. Official Action dated Sep. 18, 2009 in U.S. Appl. No. 11/482,436.
U.S. Official Action dated Sep. 18, 2009 in U.S. Appl. No. 11/482,438.
U.S. Official Action dated Nov. 23, 2009 in U.S. Appl. No. 11/164,115.
U.S. Official Action dated Nov. 24, 2009 in U.S. Appl. No. 10/119,700.
U.S. Official Action dated Dec. 21, 2009 in U.S. Appl. No. 11/428,336.
U.S. Official Action dated Jan. 6, 2010 in U.S. Appl. No. 11/691,565.
U.S. Official Action dated Jan. 14, 2010 in U.S. Appl. No. 11/164,110.
U.S. Official Action dated Jan. 22, 2010 in U.S. Appl. No. 11/164,119.
International Search Report dated Oct. 29, 2007, PCT/US2006/060713.
International Search Report dated Dec. 10, 2007, PCT/US2007/072825.
International Search Report dated Dec. 20, 2007, PCT/US2006/060703.
International Search Report dated Dec. 20, 2007, PCT/US2006/060709.
International Search Report dated Jan. 11, 2008, PCT/US2007/072819.
International Search Report dated Feb. 15, 2008, PCT/US2007/072820.
International Search Report dated May 6, 2008, PCT/US2007/072822.
International Search Report dated May 23, 2008, PCT/US2007/080869.
International Search Report dated Jul. 10, 2008, PCT/US08/070851.
International Search Report dated Jul. 15, 2008, PCT/US2006/060695.
International Search Report dated Jan. 16, 2008, PCT/US2006/060700.
International Search Report dated Sep. 22, 2008, PCT/US2008/057296.
International Search Report dated Oct. 7, 2008, PCT/US2008/070853.
International Search Report dated Nov. 12, 2008, PCT/US2008/057297.
Written Opinion dated Oct. 29, 2007, PCT/US2006/060713.
Written Opinion dated Dec. 20, 2007, PCT/US2006/060703.
Written Opinion dated Dec. 20, 2007, PCT/US2006/060709.
Written Opinion dated Jan. 16, 2008, PCT/US2006/060700.
Written Opinion dated Feb. 15, 2008, PCT/US2007/072820.
Written Opinion dated May 22, 2008, PCT/US2006/060703.
Written Opinion dated Jul. 10, 2008, PCT/US2008/070851.
Written Opinion dated Jul. 15, 2008, PCT/US2006/060695.
Written Opinion dated Sep. 22, 2008, PCT/US2008/057296.
Written Opinion dated Nov. 12, 2008, PCT/US2008/057297.
Written Opinion dated Apr. 30, 2009, PCT/US2007/080869.
Office Action for EP 06 850 729.2 dated Jan. 27, 2009.
Office Action for EP 07 812 632.3 dated Apr. 22, 2009.
Office Action for EP 07 840 350.8 dated Apr. 28, 2009.
Office Action for EP 07 812 635.6 dated May 6, 2009.
Office Action for EP 06 850 128.7 dated Jul. 17, 2009.
Office Action for EP 07 812 631.5 dated Oct. 2, 2009.
Office Action for EP 07 812 632.3 dated Oct. 23, 2009.
"Digital Video Broadcasting (DVB); DVB-H Implementation Guidelines European Broadcasting Union, Union Europeenne de Radio-Television EBUUER; ETSI TR 102 377" ETSI Standards, Lis, vol. BC, No. V1.2.1, Nov. 1, 2005, XP014032216, ISSN: 0000-0001, pp. 27, 59.
Bormans J. et al., "Video coding with H.264/AVC: tools, performance, and complexity" IEEE Circuits and Systems Magazine, IEEE Service Center, New York, NY, US, vol. 4, No. 1, Jan. 1, 2004, pp. 7-28, XP011111220, ISSN: 1531-636X.
Sherer, et al. "Appendix A Low Bandwidth Low Latency Channel Change," U.S. Appl. No. 60/719,146, filed Sep. 21, 2005.
Shoaf et al. "IGMP Capabilities in Broadband Network Architectures", Whitepaper Juniper Networks, Mar. 1, 2005, pp. 1-25, XP002999116, pp. 1-31.
Cain et al.: "Internet Group Management Protocol, Version 3; rfc3376.txt" IETF Standard, Internet Engineering Task Force, IETF, CH, Oct. 1, 2002, XP015009135, ISSN: 000-0003, pp. 1-47.
Jean-Louis Gauvreau, et al.: Optimal Coding Rate of Punctured Convolutional Codes in Multiservice Wireless Cellular Systems: IEEE Transactions on Vehicular Technology, IEEE Service Center, Piscataway, NJ, vol. 48, No. 1, Jan. 1999, XP011063794, p. 117.

De M Cordeiro C. et al., "Establishing a Trade-off Between Unicast and Multicast Retransmission Modes for Reliable Multicast Protocols." Modeling Analysis and Simulation of Computer and Telecommunication Systems, Aug. 29, 2000, pp. 85-91, XP010515402.

Gemmell, Jim. "Scalable Reliable Multicast Using Erasure-Correcting Re-sends." Microsoft Research, Technical Report MSR-TR-97-20, [Online] Jun. 30, 1997, pp. 1-15, XP002461839.

Lee, Min Jeong et al. "Performance Improvements of Wireless IP Multicast Conference System based on Designated Receivers," IEEE International Conference on Atlanta, GA, USA, vol. 2, Jun. 7, 1998-Jun. 11, 1998, pp. 807-811, XP010284688.

Nonnemacher, J. et al. "Parity-Based Loss Recovery for Reliable Multicast Transmission." IEEE/ACM Transactions on Networking, vol. 6, No. 4, Aug. 1998, pp. 349-361, XP000771969.

Paul, Sanjoy et al. "Reliable Multicast Transport Protocol (RMTP)" IEEE Journal on Selected Areas in Communications, vol. 15, No. 3, Apr. 1997, XP011054624.

Rizzo, Luigi et al. "RMDP: An FEC-based Reliable Multicast Protocol for Wireless Environments." Mobile Computing and Communications Review, vol. 2, No. 2, Apr. 1998, pp. 23-31, XP000738504.

Kemdore, R.G. "Scoped Hybrid Automatic Repeat reQuest with Forward Error Correction (SHARQFEC)." Computer Communication Review, ACM, New York, NY, vol. 28, No. 4, Oct. 1998, pp. 278-289, XP000914442.

Lacher, M.S., et al. "Performance Comparison of Centralized Versus Distributed Error Recovery for Reliable Multicast." IEEE/ACM Transactions on Networking, IEEE/ACM, New York, NY, vol. 8, No. 2, Apr. 2000, XP011038850.

Liu Wenjie et al.: "Prioritized admission strategy in a clustered video-on-demand system", IEEE Tencon' 02. 2002 IEEE Region 10 Conference on Computers, Communications, Control and Power Engineering Proceedings. Beijing, China , Oct. 28-31, 2002; New York, NY, vol. 1, Oct. 28, 2002, pp. 306-309, XP010628485, ISBN: 978-0-7803-7490-4.

Fitzek et al., "Error Control Techniques for Efficient Multicast Streaming in UMTS Networks"; Proceeding of Systemics, Cybernetics and Informatics SCI 2003 [Online] 2003, XP002477506 Orlando, Florida USA. Retrieved from the Internet URL:http//kom.aau.dk/ {ff/documents/SCI_2003.pdf> [retrieved on Apr. 21, 2008] pp. 4-5, figure 4.

Rummler et al., "Performance of Parity-Based Loss Recovery for Reliable Multicast in Third-General Mobile Networks"; Personal, Indoor and Mobile Radio Communications, 2005. PIMRC 2005. IEEE 16th International Symposium on Berlin, Germany Sep. 11-14, 2005, Piscataway, NJ, USA, IEEE Sep. 11, 2005; pp. 1641-1645, XP010926492.

Rubenstein et al., "Improving Reliable Multicast Using Active Parity Encoding Services"; (APES), 1999, IEEEE, pp. 1248-1255.

U.S. Official Action dated Feb. 19, 2010 in U.S. Appl. No. 11/164,147.

U.S. Official Action dated Feb. 26, 2010 in U.S. Appl. No. 11/482,438.

IPR dated Feb. 2, 2010, PCT/US2008/070851.

IPR dated Feb. 2, 2010, PCT/US2008/070853.

Canadian Office Action dated Feb. 8, 2010.

U.S. Official Action dated Mar. 19, 2010 in U.S. Appl. No. 11/550,441.

U.S. Official Action dated Mar. 24, 2010 in U.S. Appl. No. 11/829,255.

U.S. Official Action dated Mar. 25, 2010 in U.S. Appl. No. 11/829,274.

U.S. Official Action dated May 10, 2010 in U.S. Appl. No. 11/164,115.

U.S. Official Action dated Jun. 3, 2010 in U.S. Appl. No. 11/428,336.

U.S. Official Action dated Jun. 7, 2010 in U.S. Appl. No. 11/482,439.

Office Action for EP 07 844 052.6 dated May 18, 2010.

U.S. Official Action dated Jun. 22, 2010 in U.S. Appl. No. 11/164,119.

U.S. Official Action dated Jun. 23, 2010 in U.S. Appl. No. 11/691,565.

Office Action for EP 07 812 632.3 dated Apr. 19, 2010.

Chinese Patent Application, CN 1509027A, Jun. 30, 2004.

U.S. Official Action dated Sep. 1, 2010 in U.S. Appl. No. 11/829,255.

Canadian Office Action dated Jul. 30, 2010, Application No. 2,629,310.

Chinese Office Action dated Aug. 10, 2010, Application No. 200780038707.X.

Office Action for EP 06 850 128.7 dated Dec. 16, 2010.

U.S. Official Action dated Jan. 24, 2011 in U.S. Appl. No. 11/829,274.

Canadian Office Action dated Dec. 30, 2010, Application No. 2,657,178.

Canadian Office Action dated Jan. 6, 2011, Application No. 2,657,174.

U.S. Official Action dated Mar. 2, 2011 in U.S. Appl. No. 11/428,336.

Chinese Decision on Rejection, dated Jan. 26, 2011, Application No. 200780038707.X.

Canadian Office Action dated Feb. 21, 2011, Application No. 2,663,704.

U.S. Official Action dated Sep. 17, 2010 in U.S. Appl. No. 11/829,274.

U.S. Official Action dated Oct. 15, 2010 in U.S. Appl. No. 11/428,336.

Canadian Office Action dated Sep. 1, 2010, Application No. 2,629,320.

U.S. Official Action dated Nov. 1, 2010 in U.S. Appl. No. 11/164,119.

U.S. Official Action dated Nov. 19, 2010 in U.S. Appl. No. 11/691,565.

Canadian Office Action dated Feb. 15, 2011, Application No. 2,629,313.

U.S. Official Action dated Aug. 10, 2011 in U.S. Appl. No. 11/428,336.

Canadian Office Action dated Jun. 28, 2011, Application No. 2,682,364.

Canadian Office Action dated Jun. 28, 2011, Application No. 2,663,704.

Canadian Office Action dated Jul. 27, 2011, Application No. 2,629,320.

Office Action for EP 07 812 635.6 dated Apr. 19, 2010.

Office Action for EP 06 850 128.7 dated Apr. 22, 2010.

Canadian Office Action dated Mar. 30, 2011, Application No. 2,657,219.

Canadian Office Action dated Apr. 4, 2011, Application No. 2,657,210.

Mexican Office Action dated May 26, 2011, Application No. MX/A/2009/004151.

Office Action for EP 08 743 985.7 dated Sep. 30, 2011.

Canadian Office Action dated Oct. 6, 2011, Application No. 2,663,907.

Canadian Office Action dated Nov. 14, 2011, Application No. 2,657,174.

U.S. Official Action dated Jan. 3, 2012 in U.S. Appl. No. 11/829,255.

Chinese Office Action dated Oct. 25, 2011, Application No. 200880100567.9.

Office Action for EP 08 743 986.5 dated Jan. 19, 2012.

Office Action for EP 07 812 635.6 dated Feb. 7, 2011.

U.S. Official Action dated Mar. 30, 2011 in U.S. Appl. No. 11/164,110.

U.S. Official Action dated Jun. 27, 2011 in U.S. Appl. No. 11/829,255.

U.S. Official Action dated Jul. 7, 2011 in U.S. Appl. No. 11/829,274.

EP Communications Summons to Attend Oral Proceedings dated Jun. 8, 2012, Application No. 07840350.8.

Chinese Notice on Reexamination dated Jun. 21, 2012, Application No. 200780038707.X.

EP Communications Summons to Attend Oral Proceedings dated Mar. 8, 2012, Application No. 06850128-7.

Canadian Office Action dated Mar. 30, 2012, Application No. 2,680,851.

Chinese Notice on Reexamination dated Mar. 30, 2012, Application No. 200780038707.X.

Chinese Second Office Action dated Apr. 1, 2012, Appln No. 200880100567.9.

Canadian Office Action dated Jun. 4, 2012, Application No. 2,629,320.

Chinese Third Office Action dated Jul. 27, 2012, Appln No. 200880100567.9.
Canadian Office Action dated Aug. 24, 2012, Appln No. 2,666,861.

Office Action for EP 08 743 986.5 dated Nov. 23, 2012.

* cited by examiner

SWITCHED DIGITAL VIDEO CLIENT REVERSE CHANNEL TRAFFIC REDUCTION

FIELD OF THE INVENTION

This invention relates in general to broadband communications systems, and more particularly, to the use of delivering content in a bandwidth sensitive switched digital video system.

BACKGROUND OF THE INVENTION

Broadband communications systems, such as satellite, cable television, and direct subscriber line (DSL) systems, are now capable of providing many services in addition to broadcast video. Additional services include video-on-demand (VOD), personal video recording (PVR), high definition television, online gaming, telelearning, video conferencing, voice services, and high speed data services. In order to economize the available bandwidth in a system, a switched digital video (SDV) system may be utilized that includes devices and methods that deliver selected services only when users actively request the services. In this manner, services that are rarely viewed or only viewed by a few subscribers are only broadcasted upon request, thereby allowing bandwidth to be available for more frequently watched services.

Accordingly, the increase in the number of offered services, including SDV services, has increased the traffic in the reverse channel, which can be any data link such as DAVIC, DOCSIS, DSL, or Ethernet, to name some different channels, when each individual subscriber requests a service. The increase in reverse channel traffic is a concern for system operators since it can result in dropped packets, system instability, and impaired quality of service for the subscribers. Thus, there exists a need for minimizing reverse channel traffic when possible in order to maintain a stable communication system.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION

Preferred embodiments of the invention can be understood in the context of a broadband communications system. Note, however, that the invention may be embodied in many different forms and should not be construed as limited to the embodiments set forth herein. All examples given herein, therefore, are intended to be non-limiting and are provided in order to help clarify the description of the invention.

The present invention is directed towards enabling a switched digital video (SDV) client to selectively transmit reverse signals in order to minimize the overall reverse channel traffic. More generally, an SDV system is a system and method of maximizing the number of services, which carry programs, using a minimum amount of bandwidth. The SDV system and method allows popular services to continuously be broadcasted throughout the system, while other services are broadcasted only by request and then only if there is available bandwidth. By way of example, a specified group of popular services, such as ABC, CBS, FOX, HBO, etc., is broadcasted to every home and business in a system regardless of whether or not users are watching the service. Another specified group of services may be considered SDV services. These selected SDV services, for example, may be services that are rarely viewed or may be local services that do not always have programming available. In this manner, when an SDV client selects to receive an SDV service, an SDV server determines the available bandwidth and, if available, authorizes the broadcasting of the program for the requested service. In accordance with the present invention, the SDV client is further optimized to selectively reduce reverse signals and is described in further detail hereinbelow.

Figure 1:
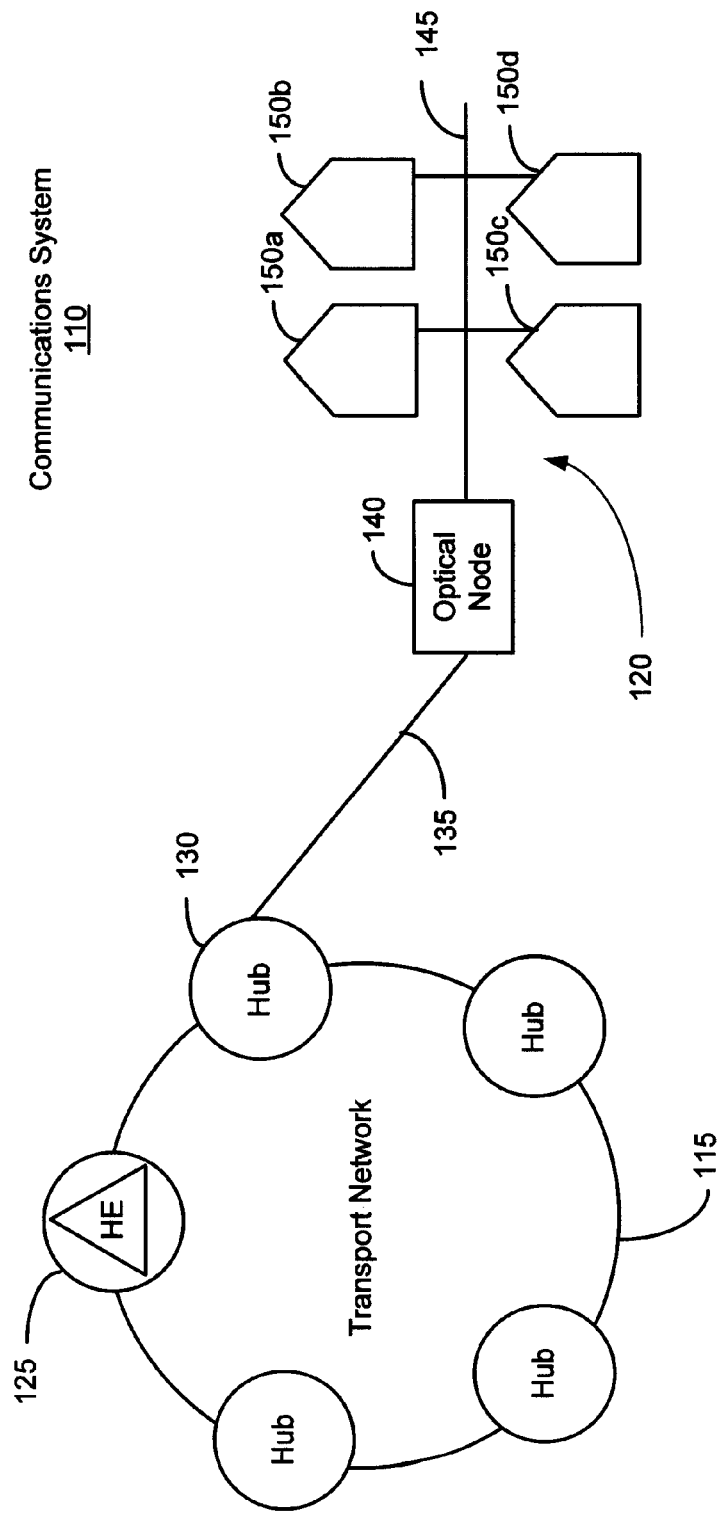
FIG. 1 is an abridged block diagram of a communications system that is suitable for use in implementing the present invention.

FIG. 1 is an abridged block diagram of a communications system 110 that is suitable for use in implementing the present invention. Typically, a communications system 110 includes a transport network 115 and a transmission network 120. The transport network 115, which is fiber optic cable, connects a headend 125 and hubs 130 for generating, preparing, and routing programs and other optical packets over longer distances; whereas a transmission network 120, which is coaxial cable, generally routes electrical packets over shorter distances. Programs and other information packets received, generated, and/or processed by headend equipment is either broadcasted to all subscribers in the system 110 or alternatively, the programs can be selectively delivered to one or more subscribers. Fiber optic cable 135 connects the transport network 115 to an optical node(s) 140 in order to convert the packets from optical packets into electrical packets. Thereafter, coaxial cable 145 routes the packets to one or more subscriber premises 150a-d.

Figure 2:
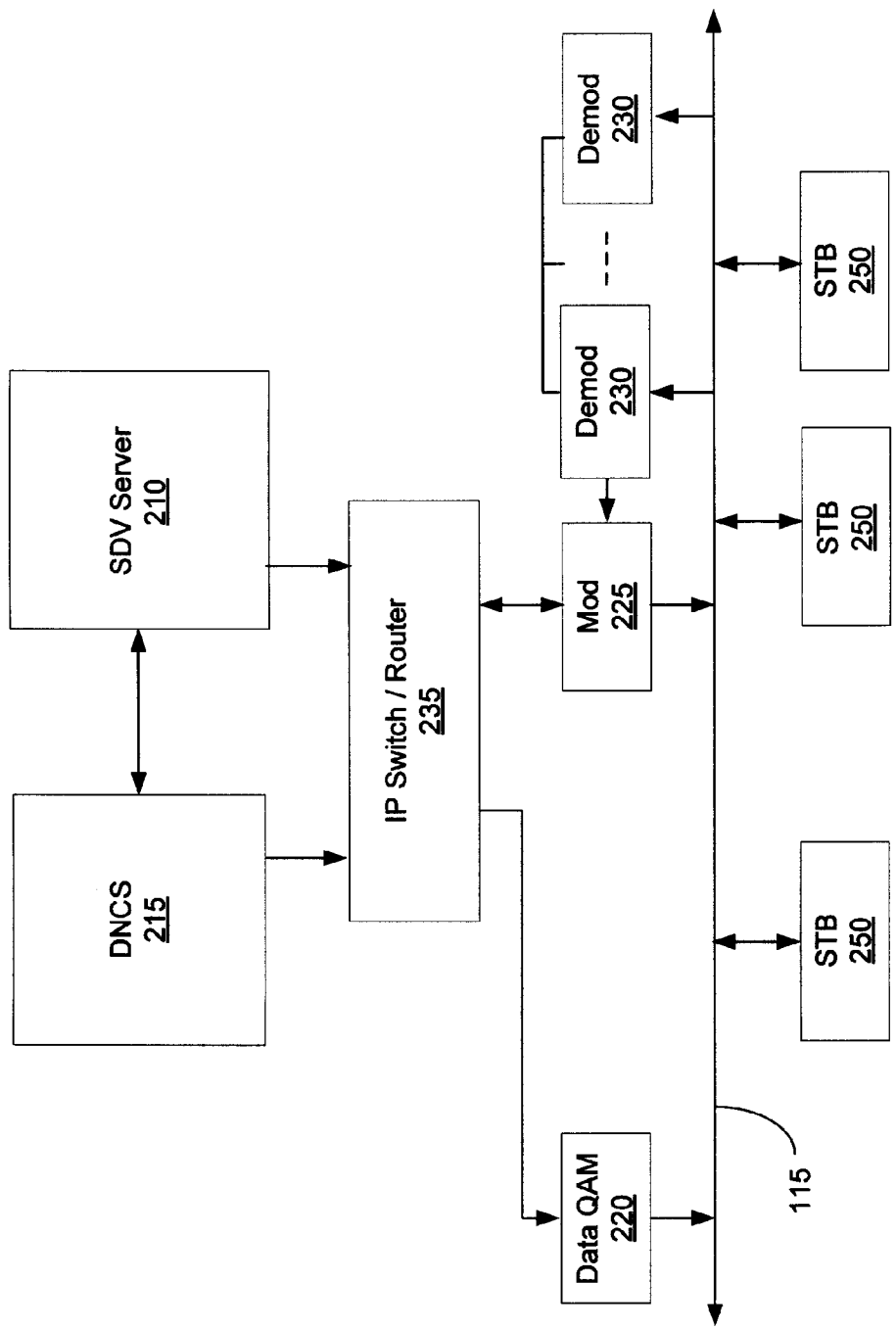
FIG. 2 is an abridged block diagram of data provider devices that are suitable for use in the communications system of FIG. 1 as well as implementing an SDV system.

FIG. 2 is an abridged block diagram of data provider devices that are suitable for use in the communications system of FIG. 1 as well as implementing an SDV system. An SDV server 210, a digital network control system (DNCS) 215, and edge devices, such as a data quadrature amplitude modulation (QAM) 220, modulators 225, and demodulators 230, among others, cooperate in order to implement an SDV system. The DNCS 215 provisions, monitors, and controls the data and devices in the system 100. Also, the DNCS 215 reserves bandwidth on the edge devices (such as SDV QAM modulator 320d (FIG. 3)) on behalf of the SDV server 210. The SDV server 210 monitors the SDV QAM modulator(s), manages bandwidth, and controls SDV sessions. Other servers, such as an application server and a VOD server exist, but are not shown for simplicity. An Internet protocol (IP) switch/router 235 routes received data packets, which may include broadcast file system (BFS) data; interactive program guide (IPG) data; set-top box (STB) software; channels (or services) and their associated frequencies, and SDV information contained in an SDV mini-carousel; according to their packet headers. Generally, in-band data packets are provided to the switch/router 235, which provides the multiplexed packets to a data QAM 220 for modulating. Alternatively, the IP switch/ router 235 routes the data packets to an out-of-band data path. Out-of-band data packets are IP packets that require modulation by modulator 225. The modulated IP packets are then provided to the transport network 115 for routing to one or more particular STBs 250.

Figure 3:
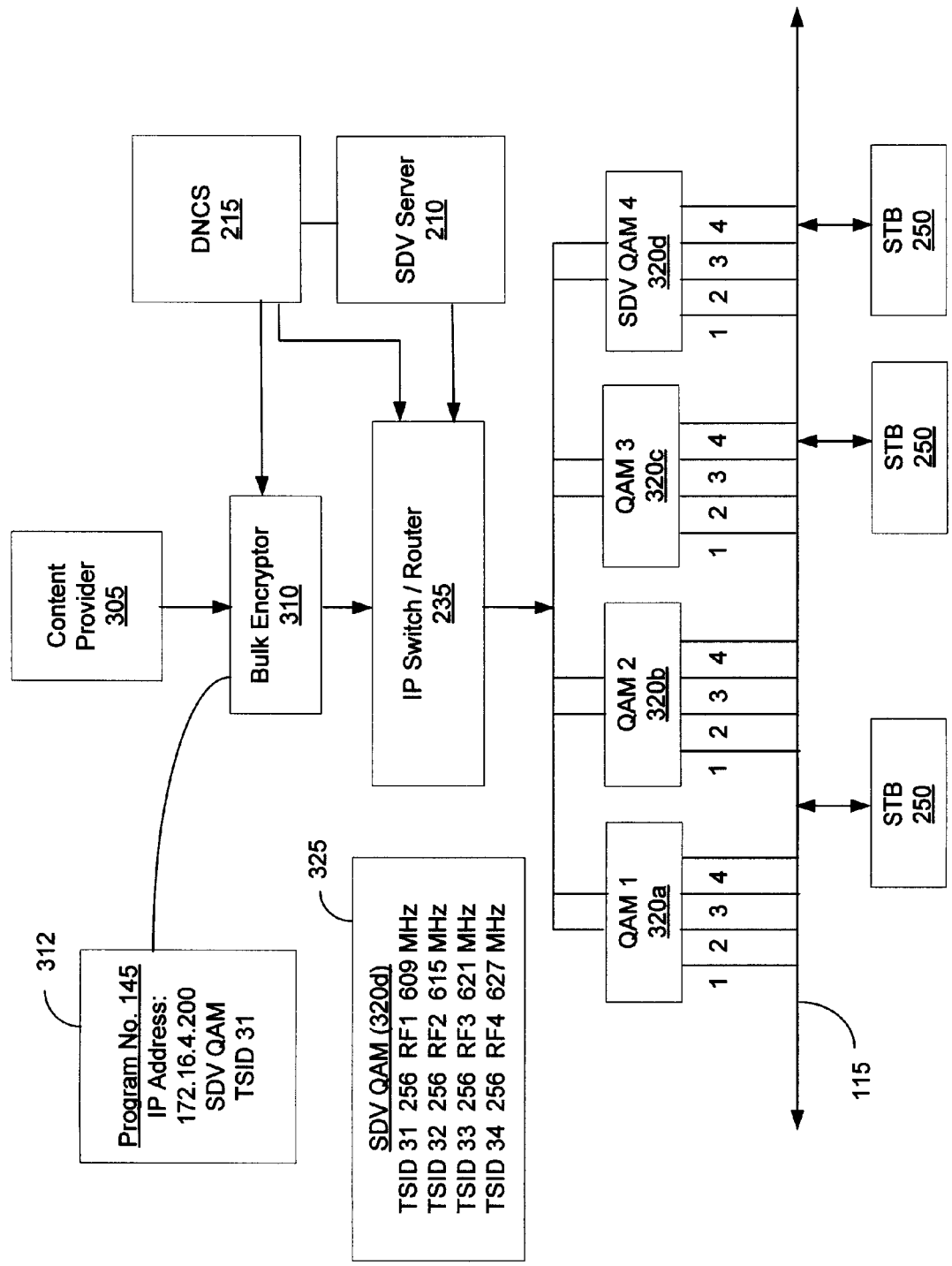
FIG. 3 is an abridged block diagram of program provider devices that are suitable for use in the communications system of FIG. 1 as well as implementing an SDV system.

FIG. 3 is an abridged block diagram of program provider devices that are suitable for use in the communications system of FIG. 1 as well as implementing an SDV system. Content providers 305 generate and transmit programs where there are non-SDV and SDV programs. Under the direction of the DNCS 215, a bulk encryptor 310 processes the programs from the content provider 305. An SDV program set-up 312 is illustrated by way of example. IP address 172.16.4.200 at the content provider 305 is accessed to receive SDV program number 145. The bulk encryptor 310 adds an intended modulator, e.g., SDV QAM 320d, and assigns the program data a transport stream identification (TSID), e.g., TSID 31. For all programs (i.e., SDV programs and non-SDV programs), the intended QAM(s) 320a-d modulate the programs onto a radio frequency (RF) carrier for transport on the transport network 115. For example, TSID 31 is modulated with 256 QAM and is transmitted on output port RF 1 of SDV QAM 320d at 609 MHz. An SDV QAM set-up 325 is illustrated by way of example including other SDV TSIDs and their output ports and frequency. It will be appreciated that the present invention is not limited to QAM modulation, but rather envisions any type of modulation scheme; additionally, the modulators can also be multi-modulators or Gigabit Ethernet (GbE) QAM modulators.

In an SDV system, the SDV server 210 requests a group of shell sessions designated as a TSID from the DNCS 215. The DNCS 215 then creates the session group utilizing at least one QAM that is designated to be the SDV QAM (e.g., SDV QAM 320d). More specifically, the DNCS 215 transmits information regarding the created session group, which may include from one (1) to 32 shell sessions on the same RF carrier frequency, to the SDV QAM 320d based on the SDV QAM's overall bandwidth capacity. The shell group information contains the list of session identifiers in the group and the total group bandwidth. The DNCS 215 then returns the service group, which may include up to 32 session identifiers, and corresponding tuning parameters (e.g., RF carrier frequency, QAM modulation format) to the SDV server 210. Additionally, the DNCS 215 performs as a bandwidth proxy manager to ensure that the SDV QAM 320d shares bandwidth among all services, i.e., VOD sessions, SDV sessions, and broadcast services, as necessary. For example, the SDV QAM 320d may also transmit VOD sessions in addition to SDV sessions.

The SDV server 210 manages the shell group session names and associated identifiers and the group bandwidth. More specifically, the SDV server 210 can use any of the SDV session identifiers within the established shell group and assign any amount of bandwidth for SDV sessions so long as the assigned bandwidth does not exceed the shell group bandwidth. Once the shell group is established, the SDV server 210 can begin to bind SDV programs according to a subscriber's request to a transport stream. The SDV QAM 320d binds a given SDV program to a transport stream by issuing a membership report using a multicast group destination address (GDA) associated with the program. The SDV session is deemed established when the binding is successful. The SDV server 210 may also provide alternate content source IP addresses in the event that the connection with the first content provider is disconnected. The SDV server 210 also specifically specifies a program name (e.g., SDV 1), a program or session identifier (e.g., 000a73df0c9a00000000), the amount of bandwidth (e.g., 7 Mb/s) required for that program, and an MPEG program number, which specifies the actual program identifiers of the selected SDV program. Additionally, the SDV server 210 may request the SDV QAM 320d to unbind any SDV program by sending an unbind request and the program identifier. Furthermore, the SDV server 210 may also query the SDV QAM 320d for bindings, and accordingly the SDV QAM 320b responds back to the SDV server 210.

Figure 4:
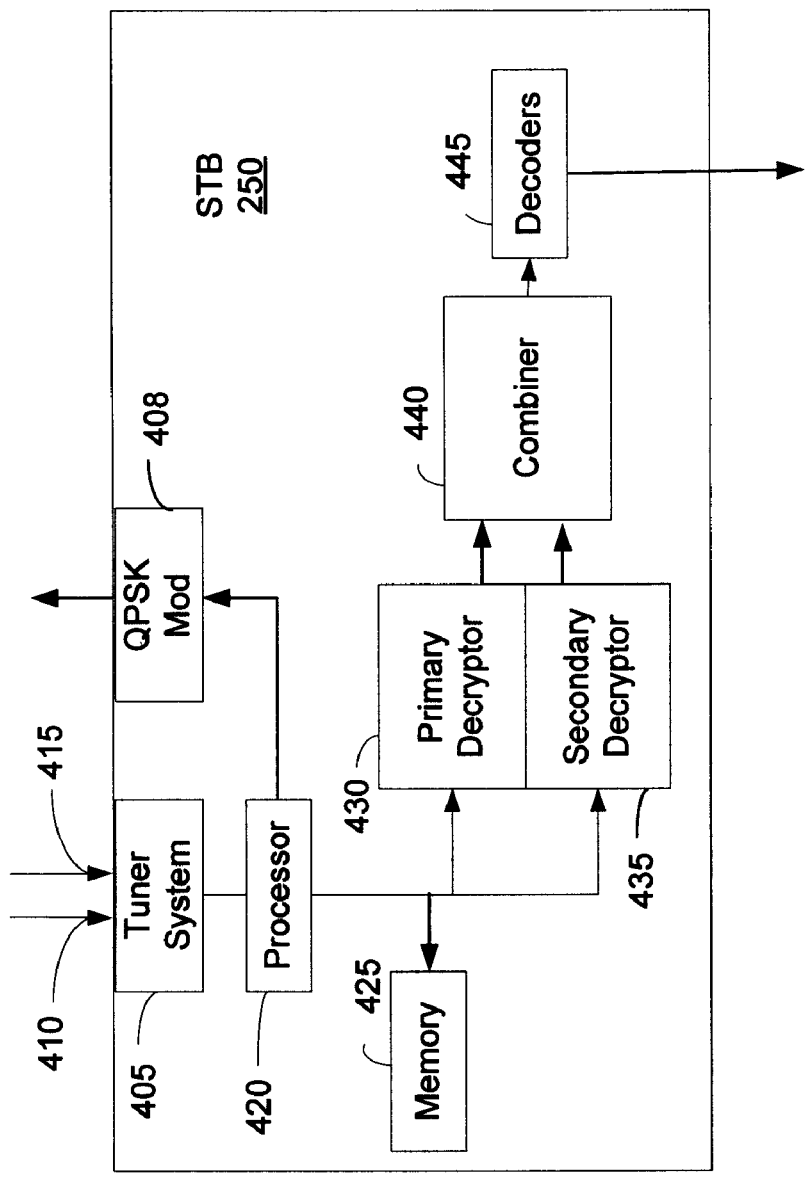
FIG. 4 is an abridged block diagram of a set-top box (STB) that is suitable for use in implementing the present invention.

FIG. 4 is an abridged block diagram of a set-top box (STB) 250 that is suitable for use in implementing the present invention. The STB 250 may request an SDV program (e.g., SDV1) by selecting from a program guide or tuning to via a tuner system 405. A request is generated by the STB 250 and transmitted to the SDV server 210 via, for example, a quadrature phase shift key (QPSK) modulator 408. Another transmission device may be a modem. One of the demodulators 230 demodulates the request and forwards the request to the SDV server 210 via modulator 225. If the program is not already broadcasting and bandwidth is available, the SDV server 210 binds the requested SDV program to a particular RF carrier frequency. The tuner system 405, which may include a single tuner or more than one tuner, then begins to receive and filter the desired program that is broadcasted on the SDV service. The SDV program is typically received on an in-band port 410 (i.e., transmitted via the SDV QAM 320d), but in some cases may also be received on an out-of-band port 415 (i.e., transmitted via the modulator 225). A processor 420 processes the program in a known manner and routes the program to memory 425 for storing and/or to one of a primary decryptor 430 or a secondary decryptor 435 for decryption. The primary decryptor 430 typically decrypts the program when it is to be displayed on a television's main display screen. The secondary decryptor 435 is typically used when the program is to be displayed in a picture-in-picture (PIP) screen located within the main display screen or when a second program is being recorded. A combiner 440 combines the two programs from the decryptors 430, 435, if necessary, and one or more decoders 445 then decode the programs for display on the television.

It will be appreciated that if the SDV service has not previously been requested by any of the plurality of STBs 250 and, therefore, is not being broadcasted, a barker may be displayed on the television 500 until the SDV service is received. Barkers may also be used when an STB 250 is not authorized for the SDV service; when there is not enough bandwidth for the SDV service; and when the SDV service is no longer available, to name some examples.

Figure 5:
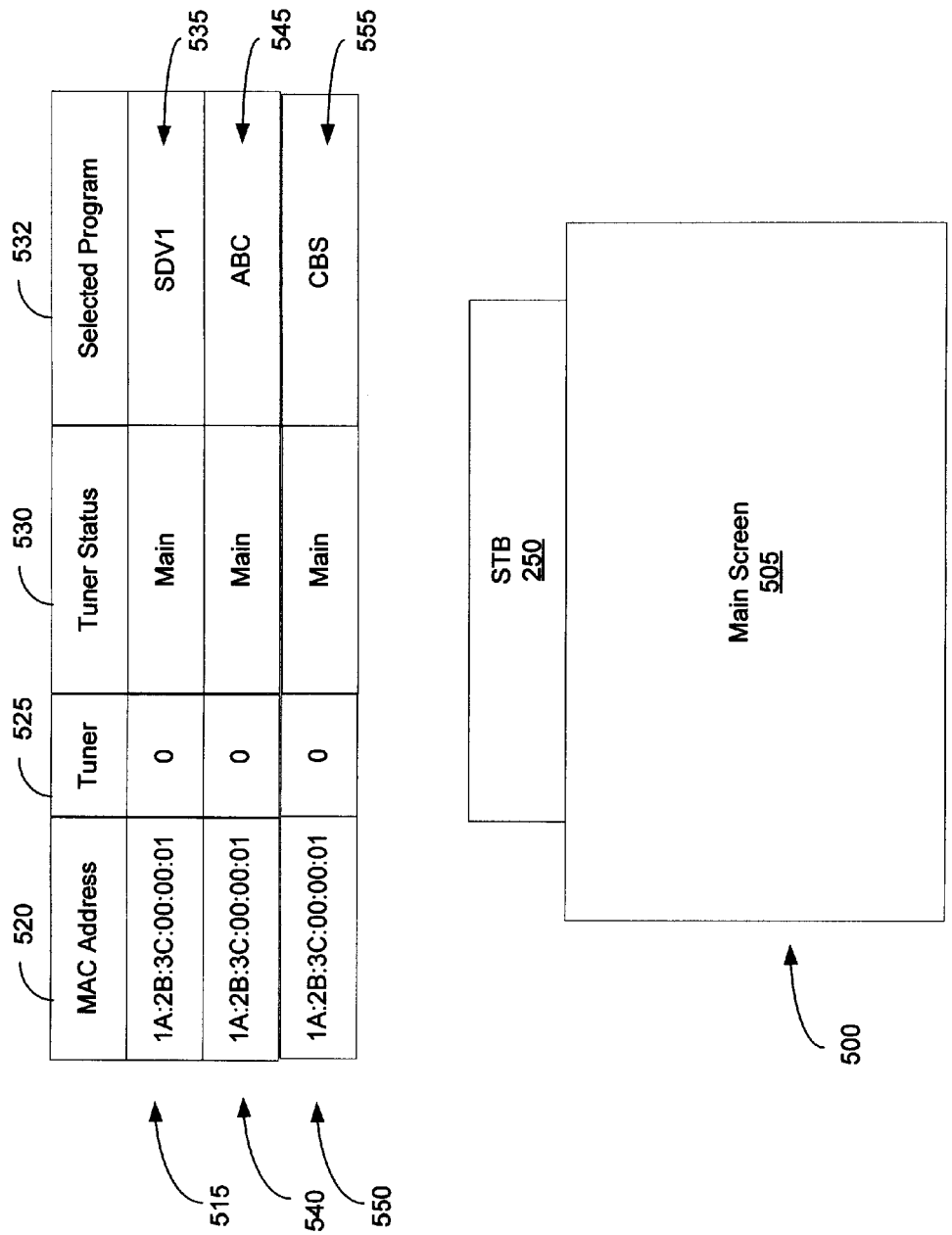
FIG. 5 is a block diagram of a STB requesting an SDV session and a television displaying the SDV service on a main screen.

FIG. 5 is a block diagram of an STB 250 requesting an SDV session and a television 500 displaying the SDV service on a main screen 505. More specifically, the STB 250 selects a desired channel that is an SDV service. The STB 250 generates a program select request 515 for the SDV session 535 (e.g., SDV1), and, if bandwidth is available, the SDV server 210 broadcasts SDV1 535 in response. Subsequently, SDV1 535 is displayed on the main screen 505. The program select request 515 includes the STB MAC address 520 (e.g., 1A:2B:3C:00:00:01), a tuner identity 525, if necessary, that identifies which tuner in a multiple tuner system 405 is filtering the requested SDV service, tuner status 530 (e.g., tuner 0 is providing the program to the main screen), and the selected program 530 (e.g., SDV1) or some other session identifier. Furthermore, since messages are transmitted from the STB 250 to the SDV server 210 with every tuner or processor 420 change, when a tuner discontinues showing the SDV1 program and tunes to another program, a program select request is transmitted stating the new status. By way of example, program select request 540 indicates that tuner 0 has tuned away from SDV1 and is now tuned to a broadcasted channel, such as ABC 545.

Notably, a reverse request, i.e., a program select request, is transmitted from every STB 250 to the SDV server 210 with every tuner or processor 420 change, such as when filtering and displaying any service or filtering and storing streaming sessions in memory. Notably, other program select requests are transmitted when the STBs 250 are making channel changes using the channel up and down keys on a remote control. For example, a user may be surfing through the channels using the remote control up or down keys. Every push of the key changes the channel and, therefore, changes the tuning frequency. For every channel change, a program select request is generated by the processor 420 and transmitted to the SDV server 210 regardless of whether the selected program is a non-SDV session or an SDV session. For non-SDV select requests, the SDV server 210 logs the occurrence of the channel change and releases any resources used by that STB for the previous channel, if appropriate.

In accordance with the present invention the processor 420 delays generating and/or transmitting a non-SDV program select request for a predetermined period of time during channel changes. In this manner, unnecessary program select requests are reduced, thereby reducing reverse traffic flow. More specifically, non-SDV program select requests may be delayed or not transmitted because no response is needed from the SDV server 210 to tune these programs. The tuning information for non-SDV programs comes from conventional system information data transmitting periodically on the network for all broadcasted programs. The processor 420 of the present invention receives a request from an IR input of the STB 250 to change the channel. The tuner system 405 changes the RF carrier frequency accordingly and provides the broadcasted streaming content to the decryptor 430 for decrypting prior to displaying on the television 500. From a predetermined channel map, the processor 420 determines that the streaming content is a broadcasted service rather than an SDV service.

As an optimization for reducing reverse network traffic in cases where a user is rapidly surfing from one channel to the next using the CH+/− keys, the STB may delay delivery of a program select request to the SDV server for non-SDV channels until a predetermined period of time, e.g., 3 seconds, after the channel has been selected. If the user changes the channel before this timeout period expires, then no program select request will be sent for the previous channel. In cases where an SDV program select request had previously been sent for the channel that was originally selected by the user prior to initiating a series of rapid channel changes across one or more non-SDV channels, the STB must ensure that the SDV server 210 is notified that this program has been deselected within a period of time, e.g., 5 seconds, of the user surfing off that channel. The STB notifies the SDV server 210 that a previously requested program has been deselected by sending a program select request message specifying a program identification of zero (0).

During the channel changes, if the processor 420 determines that a channel is changed to an SDV service and the SDV service is not already being broadcasted, a program select request is generated immediately to request the SDV service and is transmitted to the SDV server 210. The SDV server 210 binds the requested SDV service to a shell group and transmits the SDV program to the STB 250. Subsequently, when the channel is changed away from the SDV program to another program or when the STB is turned off, the processor 420 transmits another program select request to the SDV server 210 discontinuing the desire for the SDV program, and the SDV service can be unbound from the shell group.

Accordingly, systems and methods have been provided that enables an SDV client to optimize its program select requests. It is understood that though the examples described in the description can be customized by a system operator depending upon current business practices. For example, the predetermined time delay for the transmission of a program select requests regarding a broadcasted service may be changed to suit the system. Additionally, other devices can be used in the SDV system rather than the devices used and described in the description, such as, for example, a cable modem or a computer can be used to replace the STB. It will be appreciated that further embodiments are envisioned that implement the invention, for example, using all software or adding modes for additional features and services.

What is claimed is:

1. A Switched Digital Video (SDV) client for requesting and receiving services, the SDV client comprising:
    a tuner,
    a timer having a predetermined expiration time,
    a processor for receiving a request for and requesting a broadcasted service or an SDV service,
    wherein the request includes a tuner identity indicator, a tuner status, and a selected program name associated with one of the broadcasted service and the SDV service;
    the processor further configured to:
    determine if the request is for a broadcasted service or an SDV service based on a pre-determined channel map;
    delay transmitting a broadcasted service select request for a predetermined period of time during rapid channel changes until a timeout period has expired after the channel has been selected;
    immediately transmit an SDV service request to the SDV server if the SDV service is not already being broadcasted;
    notify an SDV server that a previously selected SDV program has been deselected within a period of time when a series of rapid channel changes across one or more broadcasted service channels is initiated.

2. The SDV client of claim 1, wherein when the processor receives a second request for a second broadcasted service, the timer resets to the predetermined expiration time.

3. A Switched Digital Video (SDV) system comprising:
    a plurality of set-top boxes, each set-top box (STB) for requesting and receiving a plurality of services, each STB comprising a timer and a processor;
    an SDV server;
    an application server;
    a VOD server;
    wherein popular services are continuously broadcasted throughout the system;
    wherein SDV services are broadcasted only by reverse request and then only if there is available bandwidth,
    wherein the SDV server binds SDV programs according to a subscriber's request to a transport stream,
    wherein session group bandwidth is shared among all services including VOD sessions, SDV sessions, and broadcast services.

4. The SDV system of claim 3, wherein the STB processor immediately transmits an SDV reverse request requesting the SDV service when a requested channel change is for an SDV service.

5. The SDV system of claim 3, wherein the SDV server, upon receiving the SDV reverse request, evaluates available bandwidth on an RF carrier frequency, and, if bandwidth is available, for transmitting the program associated with the SDV service.

6. The SDV system of claim 3, wherein the STB timer has a predetermined expiration time for determining when to transmit the broadcasted reverse request.

7. The SDV system of claim 3, wherein when the STB processor receives a second request for a second broadcasted service, the timer resets to the predetermined expiration time.

8. The SDV system of claim 3, wherein the broadcasted reverse request includes a tuner identity indicator, a tuner status, and a selected program name associated with the broadcasted service.

9. The SDV system of claim 3, wherein when the SDV server receives the broadcasted reverse request, the broadcasted reverse request is stored in a table.

10. The SDV system of claim 3, wherein, when the SDV server is transmitting an SDV service to the STB and subsequently receives the broadcasted reverse request, the SDV server discontinues the transmission of the SDV service.

11. A method comprising:
   receiving, by a processor, a request for a broad casted service or an SDV service, wherein the request includes a tuner identity indicator, a tuner status, and a selected program name associated with one of the broad casted service and the SDV service;
   requesting, by the processor, one of the broad casted service and the SDV service; and
   determining, by the processor, if the request is for a broad casted service or an SDV service based on a pre-determined channel map,
   delaying, by the processor and a timer having a predetermined expiration time, transmitting a broadcasted service select request for a predetermined period of time during rapid channel changes until a timeout period has expired after the channel has been selected;
   immediately transmitting, by the processor, an SDV service request to the SDV server if the SDV service is not already being broadcasted;
   notifying an SDV server, by the processor, that an SDV program has been deselected within a period of time when a series of rapid channel changes across one or more broadcasted service channels is initiated.

12. The method of claim 11, receiving, by the processor, a second request for a second broadcasted service, wherein the timer resets to the predetermined expiration time.

* * * * *